United States Patent
Nagy et al.

(10) Patent No.: US 6,281,308 B1
(45) Date of Patent: Aug. 28, 2001

(54) OLEFIN POLYMERIZATION CATALYSTS CONTAINING AMINE DERIVATIVES

(75) Inventors: Sandor Nagy, Grand Island, NY (US); Bradley P. Etherton, Cincinnati, OH (US); Ramesh Krishnamurti; John A. Tyrell, both of Williamsville, NY (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 09/761,134

(22) Filed: Jan. 16, 2001

Related U.S. Application Data

(62) Division of application No. 09/292,369, filed on Apr. 15, 1999, now Pat. No. 6,204,216.

(51) Int. Cl.$^7$ ................................ C08F 4/44; C08F 4/06
(52) U.S. Cl. ........................ 526/172; 526/161; 526/139
(58) Field of Search ...................... 526/161, 172

(56) References Cited

U.S. PATENT DOCUMENTS

| | | |
|---|---|---|
| 4,752,597 | 6/1988 | Turner ................................. 502/104 |
| 4,791,180 | 12/1988 | Turner ................................. 526/160 |
| 5,153,157 | 10/1992 | Hlatky et al. ...................... 502/117 |
| 5,171,871 * | 12/1992 | Miyashita ............................ 502/104 |
| 5,198,401 | 3/1993 | Turner et al. ....................... 502/155 |
| 5,241,025 | 8/1993 | Hlatky et al. ...................... 526/129 |
| 5,539,124 | 7/1996 | Etherton et al. ................... 548/402 |
| 5,554,775 | 9/1996 | Krishnamurti et al. ............ 556/7 |
| 5,637,660 | 6/1997 | Nagy et al. ......................... 526/160 |
| 5,707,913 * | 1/1998 | Schlund et al. .................... 502/103 |
| 5,726,115 * | 3/1998 | Horton et al. ...................... 502/155 |
| 5,852,146 * | 12/1998 | Reichle et al. ..................... 502/103 |
| 5,910,566 * | 6/1999 | Ko et al. ............................. 502/155 |
| 5,929,181 * | 7/1999 | Makovetsky et al. ............. 526/172 |
| 5,969,062 * | 10/1999 | Moll et al. .......................... 526/172 |
| 6,204,216 * | 3/2001 | Nagy et al. ......................... 526/160 |

FOREIGN PATENT DOCUMENTS

WO 96/34021  10/1996  (WO).

OTHER PUBLICATIONS

David L. Hughes, Manuel Jimenez–Tenorio, G. Jeffery Leigh, and David G. Walker; "The Chemistry of Dinitrogen Residues. Part 7. †Hydrazido (1⁻)– and N,N–Dimethylhydroxylaminato (1⁻)– Complexes of Titanium (IV)" ‡*J. Chem. Soc. Dalton Trans*. 1989, pp. 2389–2395.

* cited by examiner

Primary Examiner—Mark L. Bell
Assistant Examiner—J. Pasterczyk
(74) Attorney, Agent, or Firm—Kevin M. Carroll

(57) ABSTRACT

Olefin polymerization is performed in the presence of a catalyst comprising a compound of the formula

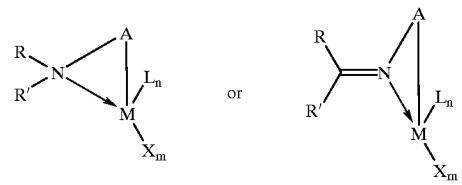

wherein M is a Group 3-10 transition metal;

A is O, S, N—R", or P—R";

L is an anionic ligand;

X is hydride, halide, $C_1$–$C_{20}$ alkoxy, siloxy, hydrocarbyl, or dialkylamido;

R, R', and R", which are the same or different, are selected from the group consisting of hydrogen and $C_1$–$C_{20}$ hydrocarbyl; and m+n equals the valency of M minus 1; and an activator.

20 Claims, No Drawings

OLEFIN POLYMERIZATION CATALYSTS CONTAINING AMINE DERIVATIVES

This is a division of Appl. Ser. No. 09/292,369, filed Apr. 15, 1999 now U.S. Pat. No. 6,204,216.

FIELD OF THE INVENTION

This invention relates to a catalyst for polymerizing olefins. The catalyst contains two polymerization-stable anionic ligands, at least one of which is an amine derivative.

BACKGROUND OF THE INVENTION

Many olefin polymerization catalysts are known, including conventional Ziegler-Natta catalysts. While these catalysts are inexpensive, they exhibit low activity and must be used at high concentrations. As a result, it is sometimes necessary to remove catalyst residues from the polymer, which adds to production costs. Furthermore, Ziegler-Natta catalysts typically produce polymers having high densities and broad molecular weight distributions, properties that are undesirable for some applications such as injection molding. They are also generally poor at controlling polymer density through incorporation of α-olefin comonomers. Unfortunately, when comonomers are used, they are distributed in a non-uniform fashion among the different molecular weights that comprise the molecular weight distribution. Most of the comonomer is incorporated into the low molecular weight polymer molecules; a more uniform incorporation would be desirable.

To improve polymer properties, highly active single-site catalysts. in particular metallocenes, are beginning to replace Ziegler-Natta catalysts. Although more expensive, the new catalysts give polymers with narrow molecular weight distributions, low densities, and good comonomer incorporation.

A metallocene catalyst consists of one or more cyclopentadienyl ring ligands bound to a transition metal in an $\eta^5$ fashion. The cyclopentadienyl ring ligands are polymerization-stable; that is, they remain bound to the metal during the course of the polymerization. One disadvantage of metallocene catalysts is that they tend to produce lower molecular weight polymers at higher temperatures.

Recent attention has focused on developing improved single-site catalysts in which a cyclopentadienyl ring ligand of the metallocene is replaced by a heteroatomic ring ligand. These catalysts may be referred to generally as heterometallocenes.

In particular, U.S. Pat. No. 5,554,775 discloses catalysts containing a boraaryl moiety such as boranaphthalene or boraphenanthrene. Further, U.S. Pat. No. 5,539,124 discloses catalysts containing a pyrrolyl ring, i.e., an "azametallocene." In addition, PCT Int. Appl. WO 96/34021 discloses azaborolinyl heterometallocenes wherein at least one aromatic ring includes both a boron atom and a nitrogen atom.

Metallocenes and heterometallocenes are much more expensive to produce than the Ziegler-Natta catalysts. Therefore, further research has focused on developing less expensive single-site catalysts that give advantageous polymer properties. One approach is to use readily available organic compounds that can act as polymerization-stable, anionic ligands for transition metals. For example, U.S. Pat. No 5,637,660 discloses catalysts in which a cyclopentadienyl moiety of a metallocene is replaced by a readily available quinolinyl or pyridinyl ligand. Other inexpensive organic ligands capable of binding a transition metal may also be available. One example is hydroxylamine derivatives Hughes, et al., *J. Chem. Soc., Dalton Trans.* (1989) 2389, for example describe the crystal structure of organometallic compounds containing hydroxylamine or hydrazine derivatives bound to a titanium complex in an $\eta^2$ fashion, but they do not describe olefin polymerization catalysts.

In sum, new single-site catalysts are needed. Particularly valuable catalysts would be easily synthesized from readily available starting materials. These catalysts would combine the cost advantages of Ziegler-Natta catalysts with the polymer property advantages of single-site catalysts.

SUMMARY OF THE INVENTION

The invention is a catalyst for polymerizing olefins. The catalyst comprises: (a) an organometallic compound of a Group 3–10 transition metal containing an amine derivative ligand; and (b) an activator such as alumoxane. The amine derivative ligand has the formula RR'N—A⁻ or RR'C=N—A⁻ where A is O, S, N—R", or P—R". Substituents R, R' and R" are hydrogen or $C_1$–$C_{20}$ hydrocarbyl. The Group 3–10 metal also contains other ligands to fill the vacancy of the metal. The additional ligands include polymerization-stable anionic ligands and a ligand X where X is hydride, halide, $C_1$–$C_{20}$ alkoxy, siloxy, hydrocarbyl, or dialkylamido.

We surprisingly found that catalysts based on amine derivative ligands are true "single-site" catalysts for olefin polymerization: they are highly productive, they incorporate comonomers well, and they give polymers with narrow molecular weight distributions.

DETAILED DESCRIPTION OF THE INVENTION

Catalysts of the invention comprise an activator and an organometallic compound of the formula:

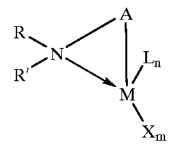

where
M is a Group 3–10 transition metal;
A is O, S, N—R", or P—R";
L is a polymerization-stable anionic ligand;
X is hydride, halide, $C_1$–$C_{20}$ alkoxy, siloxy, hydrocarbyl, or dialkylamido;
R, R', and R", which can be same or different, are selected from hydrogen and $C_1$–$C_{20}$ hydrocarbyl;
and m+n equals the valency of M minus 1.

The transition metal, M, may be any Group 3 to 10 metal or a metal from the lanthanide or actinide series. Preferably, the catalyst contains a Group 4 to 6 transition metal; more preferably, the catalyst contains a Group 4 metal such as titanium or zirconium.

When X is a $C_1$–$C_{20}$ hydrocarbyl group, it is preferably a group that lacks a hydrogen atom on a carbon that is beta to M. Thus, preferred hydrocarbyl groups include methyl, benzyl, phenyl, neopentyl, or the like.

Catalysts of the invention include a polymerization-stable anionic ligand, L. Suitable L ligands include cyclopentadienyl or substituted cyclopentadienyl anions such as those described in U.S. Pat. Nos. 4,791,180 and 4,752,597, the teachings of which are incorporated herein by reference. Suitable L ligands also include substituted or unsubstituted boraaryl, pyrrolyl, quinolinyl, and pyridinyl groups as described in U S Pat. Nos. 5,554,775, 5,539,124, and 5,637,660, the teachings of which are also incorporated herein by reference. L can also be a substituted or unsubstituted azaborolinyl ligand, such as those described in PCT Int Appl. WO 96/34021. When multiple L ligands are present, they may be the same or different.

Suitable polymerization-stable anionic ligands include amine derivatives of the formula RR'N—A⁻ or RR'C=N—A⁻ wherein R, R' and A are as described above. Thus, catalysts of the invention include ones having more than one amine derivative ligand.

The polymerization-stable anionic ligand L and the amine derivative ligand can be bridged. Groups that can be used to bridge the polymerization-stable anionic ligand and the amine derivative include, for example, methylene, ethylene, 1,2-phenylene, and dialkyl silyls. Normally, only a single bridge is used in the organometallic compound. Bridging the ligand changes the geometry around the transtion metal and can improve catalyst activity and other properties, such as comonomer incorporation and thermal stability.

A preferred catalyst comprises an activator and an organometallic compound of the formula:

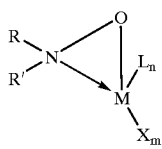

where

M is a Group 4–6 transition metal, preferably a Group 4 metal;
and L, X, R, R', m, and n are as described above.
Preferably, X is chlorine, methyl, or benzyl.

Another catalyst of the invention comprises an activator and an organometallic compound of the formula:

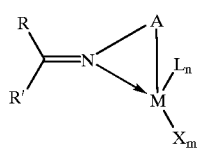

where

M is a Group 3–10 transition metal, preferably Groups 4–6 and more preferably Group 4; and
A, L, X, R, R', m, and n are as described above.
Preferably, X is chlorine, methyl, or benzyl.

A particularly preferred catalyst comprises an activator and an organometallic compound of the formula:

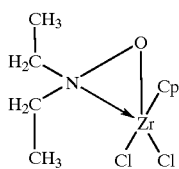

where

Cp is a cyclopentadienyl ligand.

Suitable activators include alumoxanes. Preferred alumoxanes are polymeric aluminum compounds represented by the cyclic formula $(R^4\text{—Al—O})_s$ or the linear formula $R^4(R^4\text{—Al—O})_s AlR^4$ wherein $R^4$ is a $C_1$–$C_{20}$ alkyl group and s is an integer from 1 to about 20. Preferably, R' is methyl and s is from about 4 to about 10. Exemplary alumoxane activators are (poly)methylalumoxane (MAO), ethylalumoxane, and diisobutylalumoxane. Optionally, the alumoxane activator is used with a trialkyl or triaryl aluminum compound, which preferably has the formula $AlR^5{}_3$ where $R^5$ denotes a $C_1$–$C_{20}$ hydrocarbyl. MAO and mixtures of MAO with other aluminum alkyls are preferred activators because they give high catalyst activity, good comonomer incorporation, and polymers with narrow molecular weight distributions.

Suitable activators also include substituted or unsubstituted trialkyl or triaryl boron derivatives, such as tris (perfluorophenyl)boron, and ionic borates such as tri(n-butyl)ammonium tetrakis(pentafluorophenyl) boron or trityl tetrakis(pentafluorophenyl) boron. The ionic borates ionize the neutral organometallic compound to produce an active catalyst for olefin polymerization. See, for instance, U.S. Pat. Nos. 5,153,157, 5,198,401, and 5,241,025, all of which are incorporated herein by reference.

The organometallic compound is prepared by any suitable method. Usually, the amine derivative is deprotonated with a strong base, and the resulting anion is reacted with a transition metal complex to give the organometallic compound.

In one convenient method, the amine derivative reacts with n-butyl lithium in an inert organic solvent (THF, toluene, diethyl ether, e.g.) to give an amine derivative anion. Preferably, the solution is concentrated The amine derivative anion is then preferably added to a slurry of the starting transition metal complex (e.g., cyclopentadienyl zirconium trichloride) in an organic solvent as described above. Stoichiometric quantities are typically used. The reaction can occur at room temperature, but a lower temperature of –100° C. to 0° C. is preferred By-products are removed by filtration, the solvent is evaporated, and the organometallic compound is collected.

Preferably, the organometallic compound is used promptly after preparation because it may lose activity during storage. Storage of the organometallic compound should be at a low temperature, such as –100° C. to 20° C.

It is preferable not to premix the organometallic compound and the activator, as this may result in lower catalyst activity. Rather, the organometallic compound and activator are preferably injected separately into a reactor containing the monomer to be polymerized. Preferably, the activator is injected first. The molar ratio of activator to organometallic compound is preferably from about 1:1 to about 15,000:1.

The organometallic compound and the activator may be used with a support such as silica, alumina, magnesia, or titania. A support may be required for some processes. For example, a support is generally needed in gas phase and slurry polymerization processes to control polymer particle size and to prevent fouling of the reactor walls. In one method, the organometallic compound is dissolved in a solvent and is deposited onto the support by evaporating the solvent. An incipient wetness method can also be used. The activator can also be deposited on the support or it can be introduced into the reactor separately from the supported organometallic compound.

The catalyst is particularly valuable for polymerizing olefins. preferably α-olefins. Suitable olefins include, for example, propylene 1-butene, 1-hexene, 1-octene, ethylene and the like, and mixtures thereof The catalyst is valuable for copolymerizing ethylene with α-olefins or di-olefins (e.g., 1,3-butadiene, 1,4-hexadiene, 1,5-hexadiene).

The catalysts can be used in a variety of polymerization processes They can be used in a liquid phase (slurry, solution, suspension bulk) high-pressure fluid phase, or gas phase polymerization processes or a combination of these. The pressure in the polymerization reaction zones typically ranges from about 15 psia to about 15,000 psia, and the temperature usually ranges from about −100° C. to about 300° C.

Catalysts of the invention are highly productive. Typical activities range from 40 to 200 kilograms polymer per gram transition metal per hour, or higher (see Table 2 below). The catalysts incorporate comonomers such as 1-butene well (see Example 5) and also produce polymers with narrow molecular weight distributions. Typical melt flow ratios (MFR=$MI_{20}/MI_2$) range from about 10 to about 25. A MFR below 25 indicates narrow molecular weight distribution and suggests improved properties characteristic of polymers made using a single-site catalyst. Typically, Zeigler-Natta catalysts yield polymers with MFRs of about 35.

The following examples merely illustrate the invention. Those skilled in the art will recognize many variations that are within the spirit of the invention and scope of the claims.

EXAMPLE 1

This example describes the synthesis of diethyl hydroxylamine cyclopentadienyl zirconium dichloride of the structural formula:

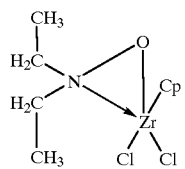

1.6 M n-butyllithium in hexane (1.7 mL, 2.72 mmol) is added to diethylhydroxylamine (0.238 g, 2.67 mmol) dissolved in 10 mL of tetrahydrofuran at −78° C. After warming to room temperature. This mixture is added via cannula to a stirred slurry of cyclopentadienyl zirconium trichloride (0.7 g, 2.67 mmol) and 30 mL of dry tetrahydrofuran at −78° C. The reaction mixture is stirred an additional 15 hours as the mixture warms to room temperature. The volatiles are removed with vacuum and the resultant solid is isolated.

EXAMPLES 2–7

In these examples, ethylene is polymerized using the catalyst of Example 1. The polymerization is conducted in a stirred 1.7-liter stainless steel autoclave at 80° C. and 110° C. Dry, oxygen-free toluene (840 mL) is charged to the dry, oxygen-free reactor. MAO (10% in toluene, from Ethyl Corporation) is added by syringe without further purification. The reactor is then heated to the desired temperature and sufficient ethylene is added to bring the reactor pressure to 150 psig. The reactor is allowed to equilibrate at the desired temperature and pressure. A solution of catalyst is prepared by dissolving 0.100 g of the catalyst of Example 1 in 100 mL of toluene, and the desired amount is added to the reactor.

After one hour, the ethylene flow is stopped and the reactor is rapidly cooled to room temperature. The polymer is filtered, dried in a vacuum oven, and weighed. Table 1 lists polymerization conditions, and Table 2 gives the results of the polymerizations.

The melt index of the polymer is measured according to ASTM D-1238, Condition E and Condition F. MI is the melt index measured with a 2.16 kg weight (Condition E). HLMI is the melt index measured with a 21.6 kg weight (Condition F). The melt flow ratio (MFR) is defined as the ratio of HLMI (or $MI_{20}$) to MI (or $MI_2$) and is a measure of molecular weight distribution. A MFR below 25 indicates narrow molecular weight distribution and suggests improved properties characteristic of polymers made using a single-site catalyst. Typically, a Zeigler catalyst yields polymer with a MFR of about 35.

TABLE 1

| | | | Polymerization Conditions | | | | |
|---|---|---|---|---|---|---|---|
| Example | Temp (° C.) | Time (min) | Hydrogen (mmoles) | Comonomer | Catalyst (mmoles) | Activator | Al/M (atomic) |
| 2 | 80 | 60 | 0 | None | 0.018 | MAO | 494 |
| 3 | 80 | 60 | 0 | None | 0.0073 | MAO | 1240 |
| 4 | 80 | 60 | 0 | None | 0.0018 | MAO | 4950 |
| 5 | 110 | 60 | 30 | Butene, 20 mL | 0.0018 | MAO | 4950 |
| 6 | 110 | 60 | 30 | None | 0.0018 | MAO | 4950 |
| 7 | 110 | 60 | 0 | None | 0.0018 | MAO | 4950 |

TABLE 2

| | | Polymerization Results | | | | |
|---|---|---|---|---|---|---|
| Example | Wt. PE (g) | Catalyst Activity (kg/g Zr/hr) | MI (dg/min) | HLMI (dg/min) | MFR | Density (g/m/) |
| 2 | 68.8 | 41.4 | 0.0430 | 0.736 | 17.3 | — |
| 3 | 69.6 | 105 | 0.0263 | 0.605 | 23.0 | 0 950 |
| 4 | 34.7 | 209 | 0.0452 | 0.729 | 16.1 | 0 958 |
| 5 | 10.8 | 65.1 | — | — | — | >0 970 |
| 6 | 10.6 | 63.9 | — | — | — | >0 970 |
| 7 | 34.7 | 209 | 1.58 | 6.08 | 10.5 | 0 962 |

We claim:

1. A method which comprises polymerizing an olefin in the presence of a catalyst comprising:

(a) a compound of the formula:

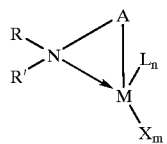

wherein M is a Group 3–10 transition metal;
A is O, S, N—R″, or P—R″;
L is an anionic ligand;
X is hydride, halide, $C_1$–$C_{20}$ alkoxy, siloxy, hydrocarbyl, or dialkylamido;
R, R', and R″, which are the same or different, are selected from the group consisting of hydrogen and $C_1$–$C_{20}$ hydrocarbyl;
and m+n equals the valency of M minus 1; and
(b) an activator.

2. The method of claim 1 wherein the olefin is ethylene or a mixture of ethylene and another olefin.

3. The method of claim 1 wherein L is a cyclopentadienyl, boraaryl, pyrrolyl, azaborolinyl, quinolinyl, or pyridinyl group, or is another amine derivative of the formula:

4. The method of claim 1 wherein M is a transition metal of Groups 4 to 6.

5. The method of claim 4 wherein M is a Group 4 transition metal.

6. The method of claim 1 wherein the activator is an alumoxane.

7. The method of claim 6 wherein the activator further comprises a trialkyl or triaryl aluminum compound.

8. The method of claim 1 wherein the activator is a trialkyl or triaryl boron compound or an ionic borate.

9. The method of claim 1 wherein the catalyst is supported.

10. A method which comprises polymerizing an olefin in the presence of a catalyst comprising:

(a) a compound of the formula:

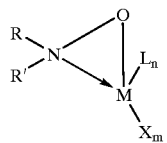

wherein M is a Group 4–6 transition metal;
L is an anionic ligand;
X is hydride, halide, methyl, phenyl, benzyl, neopentyl, or a $C_1$–$C_{20}$ alkoxy, siloxy, or dialkylamido;
R, R', and R″, which are the same or different, are selected from the group consisting of hydrogen and $C_1$–$C_{20}$ hydrocarbyl; and m+n equals the valency of M minus 1; and
(b) an activator.

11. The method of claim 10 wherein the olefin is ethylene or a mixture of ethylene and another olefin.

12. The method of claim 10 wherein L is a cyclopentadienyl, boraaryl, pyrrolyl, azaborolinyl, quinolinyl, or pyridinyl group, or is another amine derivative of the formula:

13. The method of claim 10 wherein M is a Group 4 transition metal.

14. The method of claim 10 wherein the activator is an alumoxane.

15. The method of claim 14 wherein the activator further comprises a trialkyl or triaryl aluminum compound.

16. The method of claim 10 wherein the activator is a trialkyl or triaryl boron compound or an ionic borate.

17. The method of claim 10 wherein the catalyst is supported.

18. A method which comprises polymerizing an olefin in the presence of a catalyst comprising:

(a) a compound of the formula:

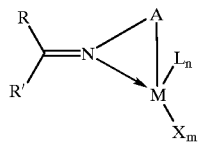

wherein M is a Group 3–10 transition metal;
A is O, S, N—R″, or P—R″;
L is an anionic ligand;
X is hydride, halide, $C_1$–$C_{20}$ alkoxy, siloxy, hydrocarbyl, or dialkylamido;
R, R', and R″, which are the same or different, are selected from the group consisting of hydrogen and $C_1$–$C_{20}$ hydrocarbyl; and
m+n equals the valency of M minus 1; and
(b) an activator.

19. The method of claim 18 wherein the olefin is ethylene or a mixture of ethylene and another olefin.

20. The method of claim 18 wherein L is a cyclopentadienyl, boraaryl, pyrrolyl, azaborolinyl, quinolinyl, pyridinyl group or another amine derivative of the formula:

* * * * *